United States Patent [19]

Oishi

[11] Patent Number: 4,614,270

[45] Date of Patent: Sep. 30, 1986

[54] MAGNETIC TAPE CASSETTE

[75] Inventor: Kengo Oishi, Kanagawa, Japan

[73] Assignee: Fuji Photo Film Co., Ltd., Kanagawa, Japan

[21] Appl. No.: 649,582

[22] Filed: Sep. 12, 1984

[30] Foreign Application Priority Data

Sep. 16, 1983 [JP] Japan .............................. 58-142350[U]
Sep. 22, 1983 [JP] Japan .............................. 58-145883[U]
Sep. 24, 1983 [JP] Japan .............................. 58-146684[U]

[51] Int. Cl.⁴ .......................................... B65D 85/672
[52] U.S. Cl. .................................. 206/389; 220/348; 242/71.2; 242/199
[58] Field of Search ................ 206/387, 389; 220/348; 229/7 SC; 242/71.2, 197–200

[56] References Cited

U.S. PATENT DOCUMENTS

| | | | |
|---|---|---|---|
| 1,904,097 | 4/1933 | Steiner | 242/71.2 |
| 2,030,134 | 2/1936 | Burgener | 229/7 SC |
| 2,313,428 | 3/1943 | Glenn | 220/348 |
| 2,531,737 | 11/1950 | Lyon, Jr. | 220/348 |
| 2,640,668 | 6/1953 | Schmidt | 206/301 |
| 3,759,465 | 9/1973 | Janssen et al. | 242/199 |
| 4,057,167 | 11/1977 | Lee | 220/348 |
| 4,399,912 | 8/1983 | Mollen et al. | 206/387 |
| 4,497,008 | 1/1985 | Schoenmakers | 242/198 |

FOREIGN PATENT DOCUMENTS 2027379 12/1971 Fed. Rep. of Germany ...... 206/387

*Primary Examiner*—William Price
*Assistant Examiner*—Jimmy G. Foster
*Attorney, Agent, or Firm*—Sughrue, Mion, Zinn, Macpeak, and Seas

[57] ABSTRACT

A compact magnetic tape cassette in which dust is prevented from entering the cassette and contaminating the tape, and which is especially suited for digital recording. The magnetic tape cassette includes two slidable guard panels, slidable to close a central opening in the cassette into which, when the guard panels are open, the tape is engaged with the recording or playback head. The guard panels are spring biased inwardly to normally close the opening. The edges of the guard panels may have recesses and protrusions to ensure a tight closure. The guard panels may be urged closed by compression springs arranged outwardly of each of the panels, or by a tension spring connected between the two panels.

5 Claims, 9 Drawing Figures

MAGNETIC TAPE CASSETTE

BACKGROUND OF THE INVENTION

The present invention relates to magnetic tape cassettes, and more particularly to a compact magnetic tape cassette which is substantially equal in size to a so-called Philips-type magnetic tape cassette.

Recently, cassette tape recorders have been reduced in both size and weight, and magnetic tape cassettes used in such recorders have been also miniaturized. Further, there has been a strong demand for provision of magnetic tape cassettes which are suitable for recording and reproducing signals with a high quality and at a high density and which have long playing times.

Heretofore, in the case of compact magnetic tape cassettes generally employed for audio usage, analog signals are utilized for recording and reproducing. In the analog system, recording and reproducing at a high density are necessarily limited. However, it is well known that employment of a digital system such as a pulse code modulation (PCM) system in which recording and reproducing operations are carried out with input signals converted into pulses makes it possible to perform high density recording and reproducing operations without noise induced in signal communication paths and without being affected by the quality of the recording media.

On the other hand, recent research and development has provided a magnetic head which, using a multi-track recording technique, can perform high density recording and reproducing operations even with a magnetic tape used in the Philips-type magnetic tape cassette. As a result, multi-track recording and reproducing operations can be achieved with a compact magnetic tape cassette which is substantially equal in size to the standard Philips-type magnetic tape cassette.

It is assumed for multi-track recording using a stationary head system thirty-six tracks are used in both directions. In this case, the width of each track is of the order of 100 microns, which is much smaller than that for the conventional four-track recording operation with the Philips-type magnetic tape cassette. That is, the effective area of the magnetic head on each track is considerably small. Therefore, if dust is present in the space between the magnetic head and the magnetic tape, its adverse effects on the recording and reproducing characteristics is much larger than in the case of the conventional recording operation.

A typical example of a magnetic tape cassette presently used for high density recording and reproducing operations is a video tape cassette, which is recorded on and reproduced using a rotary head system. In order to protect the magnetic tape in the cassette from damage and to prevent harmful influence of dust on the high density recording and reproducing operation, the cassette is provided with a swingable guard panel on the front opening. In the case of the rotary head system, the magnetic tape is run only in one direction for recording and reproducing (except when a special type cassette is used), and therefore the cassette case need not be of a symmetrical structure to permit the use of both sides A and B of the cassette. Furthermore, in the rotary head system, typically, two magnetic heads forming a predetermined angle with the tape running direction are alternately brought into sliding contact with the magnetic tape, thus removing dust from the magnetic tape. Accordingly, the adverse effects of dust on the recording and reproducing characteristics in the rotary head system are less than for a stationary head system.

A magnetic tape cassette to which the technical concept of the invention is to be applied employs a stationary head system, similar to the case of the Philips-type magnetic tape cassette, and has a number of recording tracks. Furthermore, in this magnetic tape cassette, both the upper and lower halves of the magnetic tape are used for recording and reproducing operations. Since the cassette is one which has both A and B sides, and since the cassette is operated according to the stationary head system, as explained above, the recording and reproducing characteristics are more sensitive to the adverse effects of dust than a cassette operated with the rotary head system. Accordingly, the cassette should have a guard panel which provides a greater protection against dust than the guard panel of a video tape cassette.

SUMMARY OF THE INVENTION

In view of the foregoing, an object of the invention is to provide a magnetic tape cassette which has guard panels providing positive dustproofing, has two sides of symmetrical configuration, and can be used for multi-track recording and reproducing operations.

The foregoing object and other objects of the invention have been achieved by the provision of a magnetic tape cassette which has a magnetic head inserting opening in the front of a cassette case receiving a pair of hubs on which a magnetic tape is wound, and which, according to the invention, includes slide grooves formed in the upper and lower walls of the cassette case behind the magnetic head inserting opening and extending along the front wall of the cassette case; a pair of guard panels for closing the opening, each guard panel being substantially U shaped in vertical section and having slide parts which are engaged with the slide grooves; and compression springs arranged on both sides of the opening to urge the guard panels to close. The upper and lower edges of the front wall of each guard panel have recesses with which opening means for sliding the guard panels away from each other is engaged. The two sides of the cassette are symmetrical in configuration.

Moreover, the foregoing and other objects of the invention have been achieved by the provision of a magnetic tape cassette having a magnetic head inserting opening in the front of a cassette case receiving a pair of hubs on which a magnetic tape is wound, which, according to the invention, includes slide grooves formed in the upper and lower walls of the cassette case behind and along the front wall of the cassette case; a pair of slidable guard panels, each guard panel being substantially U shaped in vertical section and having slide parts which are engaged with the slide grooves, and the guard panels having end faces which are brought into contact with each other when the guard panels close the opening, each end face having a recess and a protrusion arranged vertically and symmetrically and which are of the same configuration; and means for urging the guard panels to close the opening. Both sides of the cassette are usable for recording and reproduction.

Still further, the foregoing and other objects of the invention model have been achieved by the provision of a magnetic tape cassette which has a magnetic head inserting opening in the front of a cassette case which receives a pair of hubs on which a magnetic tape is wound, and which, according to the invention, includes slide grooves formed in the upper and lower walls of the cassette case behind the opening and extending along the front wall of the cassette case; a pair of guard panels for closing the opening, each guard panel being substantially U shaped in vertical section and having slide parts which are engaged with the slide grooves; and a tension spring connected between the two guard panels to urge the guard panels to close the opening.

DESCRIPTION OF THE PREFERRED EMBODIMENTS

The invention will be described with reference to preferred embodiments shown in the accompanying drawings.

Figure 1:
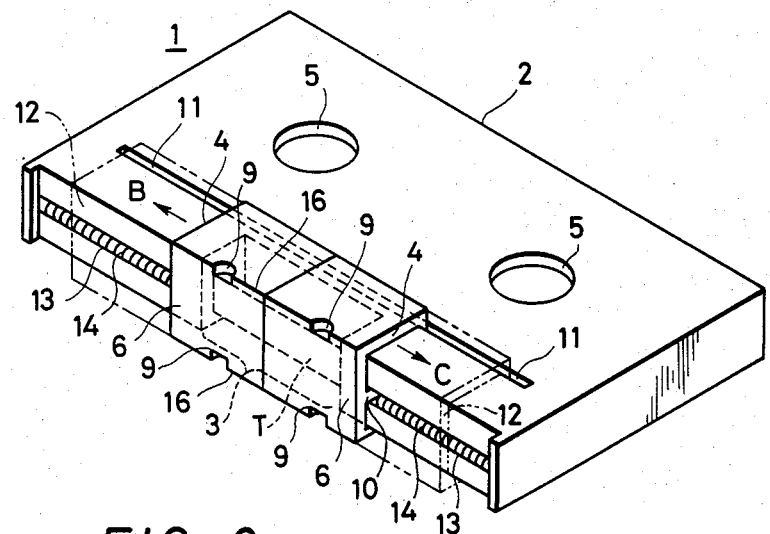
FIG. 1 is a perspective view showing a first embodiment of a magnetic tape cassette of the invention.
Figure 2:
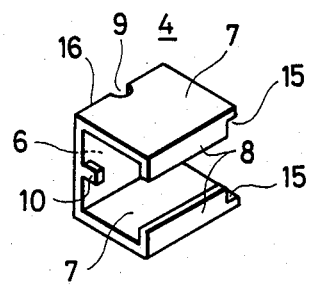
FIG. 2 is a perspective view showing the interior of a guard panel used in the cassette of FIG. 1.

FIG. 1 is a perspective view showing a magnetic tape cassette constructed in accordance with a first embodiment of the invention.

The magnetic tape cassette 1 is a compact cassette substantially equal in size to a conventional Philips-type magnetic tape cassette. The magnetic tape cassette 1 has a rectangular opening 3 in the middle portion of the front part of its cassette case body 2 in such a manner that the front wall thereof is recessed rearwardly of the cassette. A pair of guard panels 4 is coupled to the cassette that normally close the opening 3 but can slide in opposed directions to open the opening 3. The recording and reproducing head, the erasing head, the pinch rollers and the capstans of the recording and reproducing device are received in the opening 3.

A magnetic tape T wound on a pair of hubs (not shown) is laid in the cassette case body 2 in such a manner as to run along the opening 3. The hubs are arranged in the conventional manner in corresondence to a pair of shaft inserting holes 5 into which the drive shafts of the recording and reproducing device are received. The opening 3 may be provided with a shield plate which prevents the influence of external electromagnetic noise during recording and reproducing, and also with a leaf spring with a pressure pad which presses the magnetic tape T positively into sliding contact with the magnetic head.

Each of the guard panels 4 is made up of a front wall 6 and upper and lower walls 7, and is substantially U shaped in vertical section. The guard panel 4 on the left in FIG. 1 (as viewed from the front of the cassette) is slidable to the left in the direction of the arrow, and the guard panel positioned on the right is slidable to the right in the direction of the C.

Two slide grooves 11 are formed in each of the upper and lower walls of the cassette case body, arranged in a line slightly behind the opening 3, and extend in the longitudinal direction of the cassette. Slide parts 8 extend from the outer edges of the upper and lower walls 7 of each guard panel 4 towards each other. When the guard panels 4 are coupled to the cassette case body, the slide parts 8 are engaged with the respective slide grooves 11.

Recesses 9 are formed symmetrically at the middles of the upper and lower edges 16 of the front wall 6 of each guard panel 4. When the magnetic tape cassette 1 is loaded in the recording and reproducing device, an opening device 20 (FIG. 4) described below engages the recesses 9 to slide the guard panels 4 in opposite directions to open the opening.

A spring accommodating groove 13 is formed in each of the front walls 12 on both sides of the opening, the groove extending in the longitudinal direction of the cassette to divide the front wall 12 into upper and lower parts. A compression spring 14 is provided in each spring accommodating groove 13. A protrusion 10 is formed on the inside of the front wall 6 of each guard panel 4. The compression springs 14 abut against the protrusions 10 of the guard panels 4 so that the right guard panel 4 is biased to the left while the left guard panel 4 is biased to the right.

The right guard panel 4 closes the right half of the opening 3 when the left end of the slide part 8 abuts against the left end of the right slide groove 11. The left guard panel 4 closes the left half of the opening in the same manner.

Cuts 15 are formed in the end portions of the slide parts 8 of the guard panels which abut against the ends of the slide grooves as described above so that the guard panels 4 are positively engaged with each other.

With the slide grooves 11 and the slide parts 8 formed as described above, even if the compression springs 14 produce different compression forces, the guard panels 4 positively close the opening 3.

In order to prevent the compression springs 14 from springing out of the cassette, each spring accommodating groove 13 is formed so that its section is divergent rearwardly of the cassette.

Figure 3:
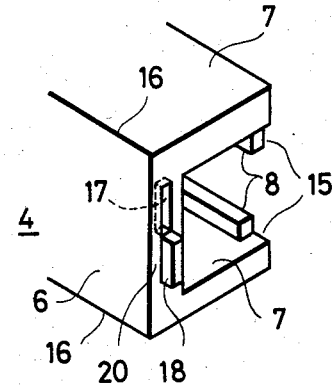
FIG. 3 is an enlarged perspective view showing the end face of the guard panel of FIGS. 1 and 2.

FIG. 3 is a perspective view showing the end face 20 of the guard panel in large scale. As shown in FIG. 3, each of the U-shaped end faces 20, which are brought into contact with each other to close the opening 3, has a trapezoidal recess 17 and a trapezoidal protrusion 18. The recess 17 and the protrusion 18 are completely equal in configuration and are positioned vertically symmetrically.

The material of the cassette case body 2 is not particularly limited; it may be a plastic resin such as polyacetal resin and ABS resin. The guard panels 4 may be made of plastic resin, such as polyacetal resin, or metal. However, it is desirable that the material be elastic so that the guard panels can be readily coupled to the cassette case body 2.

The magnetic tape T may be of the ferromagnetic iron oxide or chromium dioxide types. However, it is preferable that the magnetic tape T be a tape such as a metal tape or a vacuum deposited tape suitable for high density recording and reproducing operations.

When the magnetic tape cassette 1 thus constructed is loaded in the recording and reproducing device, the guard panels 4 are opened by the above-described opening device 20 in the cassette inserting section. The operation of the guard panels 4 caused by the opening device 20 will be described with reference to FIG. 4.

Figure 4:
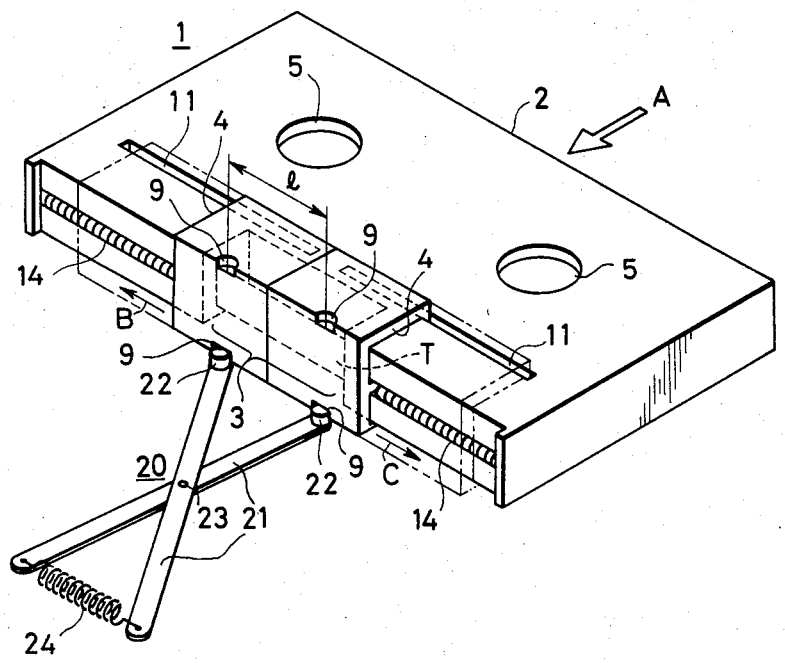
FIG. 4 is a perspective used for a description of the operation of the guard panels.
Figure 5:
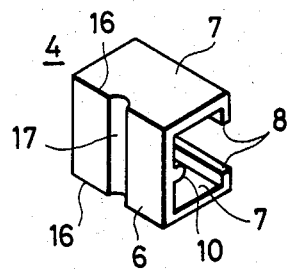
FIG. 5 is a perspective view showing a modification of the guard panels.

As shown in FIG. 4, the opening device 20 includes a pair of plate-shaped arms 21 having engaging parts 22 which engage with the recesses 9 of the guard panels 4, and a tension spring 24. The arms 21 cross each other substantially at the middle points thereof. The arm are designed so as to be rotatable about the cross point 23. The tension spring 24 is connected between two ends of the arms 21 opposite to the engaging parts 22. The opening device 20 is disposed above or below in the cassette inserting section. Furthermore, the opening device 20 is arranged so that the engaging parts 22 are directed towards the cassette inserting opening and the distance between the engaging parts 22 is equal to the distance l between the recesses 9 of the guard panels 4.

While the magnetic tape cassette 1 is being pushed into the cassette inserting section (as indicated by the arrow A), the engaging parts 22 are engaged with the recesses 9. As the magnetic tape cassette 1 is further pushed into the cassette inserting section, the arms 21 are opened to increase the distance between the engaging parts 22 so that the guard panels 4 are slidably moved away from each other as indicated by the arrows B and C.

With recesses 9 symmetrically formed in the guard panels 4 as described above, the guard panels 4 are opened for both ways of inserting the cassette, that is, for playing or recording on both sides of the cassette. After the guard panels 4 move right and left to open the opening 3, the magnetic tape T can be subjected to signal recording or reproducing.

When the magnetic tape cassette 1 has been unloaded from the recording and reproducing device, the guard panels 4 are automatically closed by the compression springs 14 so that the opening 3 is completely closed.

In the above-described guard panels 4, the recesses 9 are formed symmetrically at the upper and lower edges 16 of the front wall 6. However, it should be noted that the invention is not limited thereto or thereby. For instance, the recesses may be replaced by an engaging groove 17 which is formed vertically in the front wall 6 in such a manner that it divides the front wall 6 into the right and left parts. It is not always necessary for the recesses 9 to be formed at the middle of the upper and lower edges 16 of the front wall 6. That is, the recesses 9 can be formed at any positions on the upper and lower edges 16 as long as the formation of the recesses meets the condition that both sides of the magnetic tape cassette 1 are symmetrical in configuration, that is, both A and B sides can be used.

In the above-described embodiment, the recess 17 and the protrusion 18 are trapezoidal and are positioned adjacent each other. However, the recess 17 and the protrusion 18 may be shaped as desired, and it is not always necessary to position them adjacent each other.

It is not always necessary for the length of each slide part 8 to be substantially equal to that of the guard panel 4. For instance, the length of the slide part 8 may be reduced to about a half the latter, or the slide part 8 may be replaced by a plurality of spot-like protrusions which are formed at certain intervals.

As described above, in the magnetic tape cassette according to the invention, recesses 9 are formed symmetrically at the upper and lower edges of each of the guard panels 4 which are slidably parted right and left, and, merely by pushing the magnetic tape cassette 1 to load it into the recording and reproducing device, the engaged parts 22 are engaged with the recesses 9 and the guard panels 4 are opened right and left. Therefore, the magnetic tape cassette 1 according to the invention is suitable for a multi-track recording and reproducing operations employing a stationary head system whereby both sides of the cassette are available for recording and reproducing.

When the cassette is in storage (not in use), the opening 3 is completely closed by the guard panels 4. The guard panels protect the magnetic tape T from damage and dust and maintain the recording and reproducing characteristics unchanged.

According to the invention, the opening device 20 for opening the guard panels 4 is very simple in construction, and therefore the provision of the opening device 20 will not make the recording and reproducing device intricate.

Figure 6:
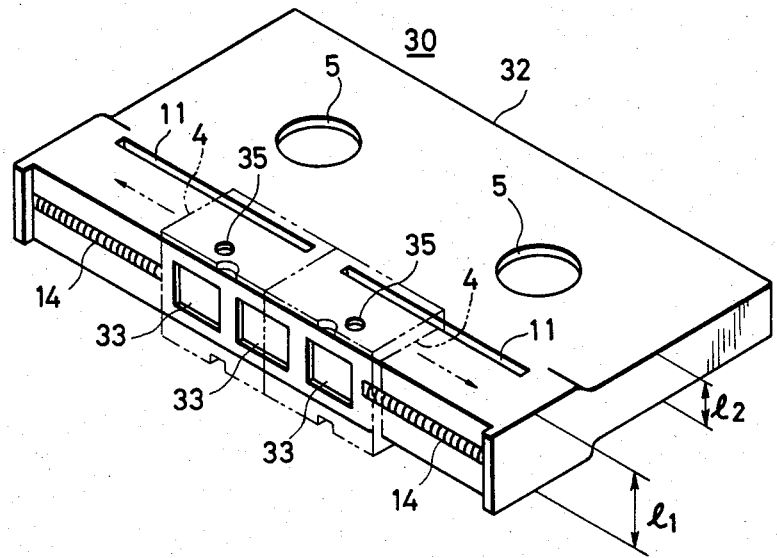
FIG. 6 is a perspective view showing a second embodiment of a magnetic tape cassette of the invention.

In the above-described embodiment, the opening 3 is formed by rectangularly forming the cassette body in such a manner that it is recessed rearwardly of the cassette body. However, the technical concept of the invention can be applied to a magnetic tape cassette as shown in FIG. 6, which is a second embodiment of the invention. The second embodiment will be described with reference to FIG. 6.

In the second embodiment, as in the conventional compact cassette, the cassette case body 32 has three rectangular holes 33 in the opening region of its front wall. Capstan holes 35 are formed in the upper and lower walls of the cassette case body slightly behind the right and left rectangular holes 33, and the capstan holes in the upper walls are vertically in alignment with the capstan holes in the lower wall. The rectangular holes 33 receive the magnetic head, the erasing head, and the pinch rollers. The capstans are inserted into the capstan holes 35.

In FIG. 6, the guard panels 4 (indicated by broken lines) for closing the rectangular holes 33, slide grooves 11, and compression springs 14 for biasing the guard panels 4 may be the same as those in the first embodiment. Furthermore, a structure for accommodating the compression spring 14 may also be the same as that in the first embodiment. In the magnetic tape cassette cassette body 32 of FIG. 6, the thickness $l_1$ of its front part is larger than that $l_2$ of its rear part. The magnetic tape cassette 30 thus constructed has the same effects as that shown in FIG. 1.

Because the guard panels 4 mounted on the cassette case body 2 are completely equal in configuration to each other, the guard panels 4 can be manufactured with the same metal mold. This is considerably economical.

Figure 7:
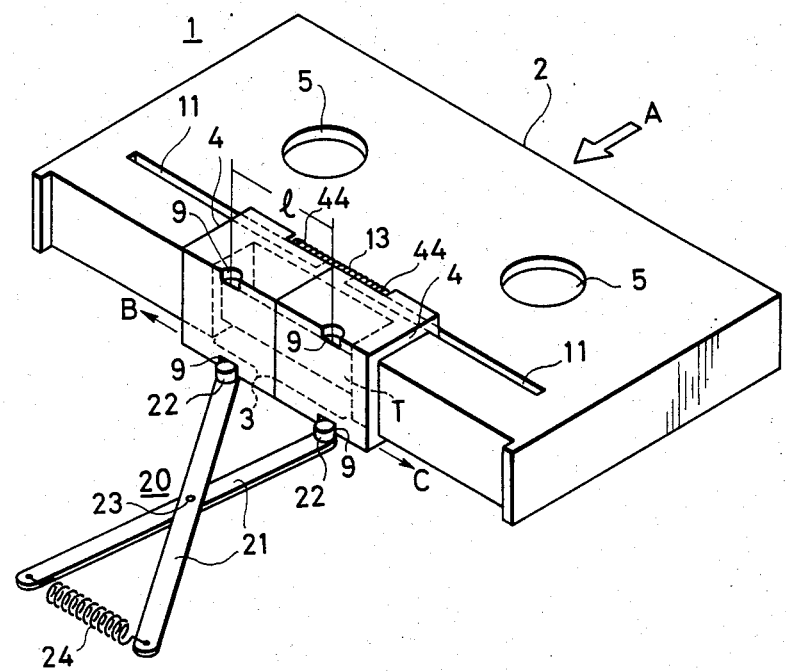
FIG. 7 is a perspective view of a magnetic cassette according to a third embodiment of the invention.
Figure 8:
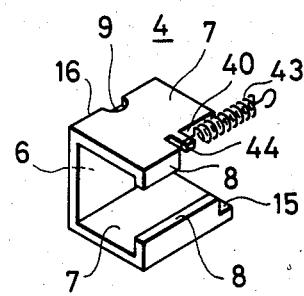
FIG. 8 is a perspective view showing the interior of a guard panel used in the cassette of FIG. 7.

In an embodiment shown in FIGS. 7 and 8, a spring connecting cut 40 is formed in one of the upper and lower walls 7 of each guard panel 4 near the middle of the opening 3 when the guard panel 4 is coupled to the cassette case body 2. A protrusion 44 with which a tension spring 43 engages extends from the wall 7 into the spring connecting cut 40. The tension spring 43 is connected to the two protrusions 44 of the guard panels so that the guard panels 4 are pulled towards each other.

Figure 9:
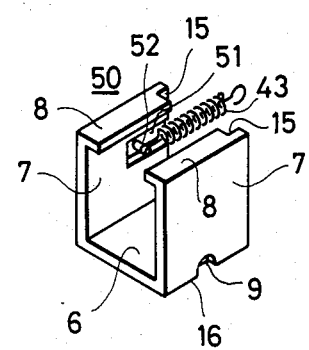
FIG. 9 shows a modification of the guard panel of FIGS. 7 and 8.

In a further embodiment shown in FIG. 9, each guard panel 50 has a tension spring accommodating groove 51 formed in one of the upper and lower walls 7, and a protrusion 52 formed in the groove 51. The spring 43 is fastened to the protrusion 32 thus formed. More specifically, in order to allow the guard panels 50 to smoothly slide along the slide grooves, the protrusion 52 and the spring 43 are so designed that they do not appear above the surface of the wall 7 in which the tension spring accommodating groove 51 is formed. The right and left guard panels 50 engaged with the opening 3 are pulled towards each other by the tension spring 43 in the same manner as in the above-described embodiment to close the opening 3.

The technical concept of the model is applicable to a magnetic tape cassette which is substantially equal in size to the conventional compact cassette as described above. However, it should be noted that the invention is not limited thereto or thereby. That is, the technical concept of the invention is applicable to various other types of magnetic tape cassettes.

I claim:

1. In a magnetic tape cassette having a magnetic head inserting opening in a front wall of a cassette case and receiving a pair of hubs on which a magnetic tape is wound, the improvement wherein said magnetic tape cassette comprises:
 a pair of slidable guard panels for closing said opening, each guard panel being substantially U shaped in vertical section and having slide parts engaged with slide grooves formed in the upper and lower walls of said cassette case behind said opening and extending along said front wall of said cassette case, said guard panels having end faces brought into contact with each other when said guard panels close said opening, each end face having a recess and a protrusion arranged vertically, said recesses and protrusions being symmetrical and of like configurations; and
 means for urging said guard panels to close said opening,
 said cassette being symmetrical in configuration.

2. In a magnetic tape cassette having a magnetic head inserting opening in a front wall of a cassette case and receiving a pair of hubs on which a magnetic tape is wound, the improvement wherein said magnetic tape casette comprises:
 a pair of slidable guard panels for closing said opening, each guard panel being substantially U shaped in vertical section and having slide parts engaged with said grooves formed in the upper and lower walls of said cassette case behind said opening and extended along said front wall of said cassette case; and
 a tension spring connected between said two guard panels to urge said guard panels to close said opening,
 said cassette being symmetrical in configuration.

3. The magnetic tape cassette of claim 2, wherein each of said guard panels has a spring-receiving cut formed in at least one of said upper and lower walls near a middle of said opening, and wherein a protrusion is formed on each of said guard panels with which an end of said tension spring is engaged.

4. The magnetic tape cassette of claim 3, wherein said protrusion is formed as an extension of said one of said upper and lower side walls in said spring-receiving cut.

5. The magnetic tape cassette of claim 2, wherein each of said guard panels has a spring-accommodating groove formed interiorly in at least one of said upper and lower walls, and wherein a protrusion is formed in said groove to which one end of said tension spring is attached.

* * * * *